(12) United States Patent
Zhu et al.

(10) Patent No.: US 8,363,549 B1
(45) Date of Patent: Jan. 29, 2013

(54) ADAPTIVELY MAINTAINING SEQUENCE NUMBERS ON HIGH AVAILABILITY PEERS

(75) Inventors: Droplet Zhu, Beijing (CN); Jiafeng Tang, Beijing (CN); Tianji Fang, Beijing (CN)

(73) Assignee: Juniper Networks, Inc., Sunnyvale, CA (US)

(*) Notice: Subject to any disclaimer, the term of this patent is extended or adjusted under 35 U.S.C. 154(b) by 716 days.

(21) Appl. No.: 12/552,929

(22) Filed: Sep. 2, 2009

(51) Int. Cl.
*H04N 7/173* (2011.01)

(52) U.S. Cl. ........ 370/235; 370/225; 370/252; 370/468; 709/235; 709/227

(58) Field of Classification Search ............... 370/225, 370/235, 468, 229, 231, 328; 709/235, 227; 714/4.11, 712
See application file for complete search history.

(56) References Cited

U.S. PATENT DOCUMENTS

| | | | |
|---|---|---|---|
| 5,848,227 A | 12/1998 | Sheu | |
| 6,219,706 B1 | 4/2001 | Fan et al. | |
| 6,594,229 B1 | 7/2003 | Gregorat | |
| 6,633,544 B1 | 10/2003 | Rexford et al. | |
| 6,671,694 B2 | 12/2003 | Baskins et al. | |
| 6,697,378 B1 * | 2/2004 | Patel ........................ | 370/468 |
| 6,751,191 B1 | 6/2004 | Kanekar et al. | |
| 6,799,319 B2 | 9/2004 | Van Loo | |
| 6,853,617 B2 | 2/2005 | Watson et al. | |
| 6,865,591 B1 | 3/2005 | Garg et al. | |
| 6,910,148 B1 | 6/2005 | Ho et al. | |
| 6,948,088 B1 | 9/2005 | Sharan | |
| 6,965,903 B1 | 11/2005 | Agarwal et al. | |
| 6,983,317 B1 | 1/2006 | Bishop et al. | |
| 7,076,555 B1 | 7/2006 | Orman et al. | |
| 7,076,696 B1 | 7/2006 | Stringer et al. | |
| 7,096,383 B2 | 8/2006 | Talaugon et al. | |
| 7,111,035 B2 | 9/2006 | McClellan et al. | |
| 7,162,737 B2 | 1/2007 | Syvanne et al. | |
| 7,164,676 B1 | 1/2007 | Chakraborty | |
| 7,236,453 B2 | 6/2007 | Visser et al. | |
| 7,269,133 B2 | 9/2007 | Lu et al. | |
| 7,292,535 B2 | 11/2007 | Folkes et al. | |
| 7,417,947 B1 | 8/2008 | Marques et al. | |
| 2002/0107966 A1 | 8/2002 | Baudot et al. | |
| 2003/0056138 A1 | 3/2003 | Ren | |
| 2003/0084371 A1 | 5/2003 | Mongazon-Cazavet et al. | |

(Continued)

OTHER PUBLICATIONS

U.S. Appl. No. 10/678,280, filed Oct. 3, 2003, entitled "Synchronizing State Information Between Control Units".

(Continued)

*Primary Examiner* — Michael Thier
*Assistant Examiner* — Jamal Javaid
(74) *Attorney, Agent, or Firm* — Shumaker & Sieffert, P.A.

(57) ABSTRACT

A primary network element of a high availability cluster periodically synchronizes sequence numbers with a backup network element of the cluster. The primary determines the periodicity of updates according to a window size and a scale factor. The backup uses probe packets after switchover to discover the current sequence number. In one example, the primary network element includes an interface to receive first and second packets of a packet flow, a control unit to determine whether a difference between sequence numbers of the first and second packets exceeds an update window size value associated with the packet flow that is based on a window size value and a window scale factor associated with the packet flow, and a backup network interface configured to send an update message comprising the second sequence number to the backup network element of the high-availability cluster.

30 Claims, 9 Drawing Sheets

U.S. PATENT DOCUMENTS

| | | | |
|---|---|---|---|
| 2003/0217096 | A1 | 11/2003 | McKelvie et al. |
| 2004/0034871 | A1 | 2/2004 | Lu et al. |
| 2004/0042395 | A1* | 3/2004 | Lu et al. .................. 370/225 |
| 2004/0073646 | A1 | 4/2004 | Cho et al. |
| 2004/0073831 | A1 | 4/2004 | Yanai et al. |
| 2004/0078619 | A1 | 4/2004 | Vasavada |
| 2004/0078625 | A1 | 4/2004 | Rampuria et al. |
| 2004/0199808 | A1 | 10/2004 | Freimuth et al. |
| 2005/0257213 | A1 | 11/2005 | Chu et al. |
| 2007/0183330 | A1* | 8/2007 | Salt ........................ 370/235 |
| 2007/0234414 | A1* | 10/2007 | Liu .......................... 726/11 |
| 2008/0025216 | A1* | 1/2008 | Singh et al. ............. 370/231 |
| 2008/0037420 | A1* | 2/2008 | Tang ........................ 370/229 |

OTHER PUBLICATIONS

U.S. Appl. No. 12/328,352, filed Dec. 4, 2008, entitled "Peer-Agnostic TCP Socket Replication Between Primary and Secondary Routing Engines".

RFC 793, "Transmission Control Protocol," Darpa Internet Program Protocol Specification, Sep. 1981, 89 pp.

* cited by examiner

ADAPTIVELY MAINTAINING SEQUENCE NUMBERS ON HIGH AVAILABILITY PEERS

TECHNICAL FIELD

This disclosure relates to computer networks and, more particularly, to high availability computer networks.

BACKGROUND

The goal of high availability computer network environments is to provide users and other entities with "always on" service. That is, high availability computer network environments should provide reliable, continuous operation service. To accomplish this, network devices in a high availability environment perform error detection and implement recoverability for detected errors. Unfortunately, network devices occasionally fail. For example, a software or hardware problem or a power fault within a security device may cause all or a portion of the security device to stop functioning.

When a network device fails, all network traffic flowing through the failed network device may cease. For an enterprise that depends on such network traffic, this may be unacceptable, even if this failure occurs only for a short time. To minimize the possibility of a failure causing all network traffic to cease, a backup network device may be installed. Thus, if the network device that has primary responsibility for performing the security services (i.e., the master device) fails, the backup device may be quickly substituted for the master device. In other words, the failing network device "fails over" to the backup device. A master device may also "switch over" to the backup device to go offline temporarily, e.g., to install software and/or firmware updates or to undergo other routine maintenance procedures. In general, failover is considered a form of switchover. After failing over or switching over to the backup device, the backup device becomes the master device. High availability clusters often include such primary and backup network devices.

A firewall is one example of a network device in a high availability network environment. Firewalls generally inspect packets and packet flows of a computer network to detect and block malicious data. One aspect of a packet flow inspected by some firewalls is transmission control protocol (TCP) sequence numbers. These firewalls inspect TCP sequence numbers in a process commonly referred to as stateful inspection, which generally refers to the process of verifying that communications as part of a network session match the current TCP state. Such firewalls are commonly referred to as stateful firewalls. Stateful firewalls generally drop communications that are allegedly part of a network session when those communications are outside the current TCP state or are invalid with respect to the current TCP sequence. Such communications are identified using the TCP sequence numbers of the communications. Having the proper TCP sequence numbers is also necessary to properly forward packets to a destination device.

In order for a primary stateful firewall to switchover or failover to a backup stateful firewall in a high availability computer network, the backup firewall must be aware of the current TCP state, including current or recent TCP sequence numbers. That is, the backup stateful firewall should not break the TCP sequence number check. However, updating the backup stateful firewall with every communication received by the primary stateful firewall would cause too many updates to be sent, which may overburden either or both of the primary stateful firewall and/or the backup stateful firewall.

SUMMARY

In general, this disclosure describes techniques for adaptively maintaining sequence numbers on high availability peers, that is, primary and backup network devices. The peers typically comprise a primary network device and a backup network device that utilize transmission control protocol (TCP) sequence numbers, such as primary and backup stateful firewalls. The techniques of this disclosure include periodically sending TCP sequence number updates from the primary device to the backup device for a packet flow. The primary device determines the periodicity or frequency with which to send updates to the backup device based on characteristics of the packet flow. Thus for a plurality of packet flows, the primary device may send updates at different times for each of the packet flows.

One characteristic of a packet flow on which the primary device bases its determination of frequency of updates is the size of the TCP window. The TCP window generally describes how much outstanding (that is, unacknowledged) data a sender can send before having to stop transmission and wait for an acknowledgement. In accordance with the principles described herein, a TCP scale factor is used to scale the TCP window of the packet flow by factors of two, based on the value of the TCP scale factor. An update window size value can be calculated by left-shifting the TCP window size value a certain number of times, where the number of times is equal to the TCP scale factor. The techniques of this disclosure prescribe updating the sequence numbers of a particular packet flow from the primary to the backup network device when the difference between the current sequence number of the packet flow and the last update for the packet flow exceeds (e.g., is greater than) the calculated update window size value. When the TCP window size changes, these techniques additionally prescribe adaptively modifying the update window size accordingly.

The backup device stores the TCP window size and TCP window scale factor, as well as each sequence number received from the sequence number updates and a maximum segment size value. After a switchover or failover, the backup device generates and sends probe packets used to determine the current TCP sequence number of the packet flow. In particular, the backup device generates and sends probe packets including a TCP sequence number starting with the sequence number of the last update and increased by the maximum segment size value. The backup device continues to generate and send probe packets with TCP sequence numbers that are one maximum segment size greater until the backup device receives a retransmission of the last packet from the packet flow client or an acknowledgement of the highest sequence number received from the packet flow server. After receiving the current sequence numbers for each packet flow, the backup device is able to act as a primary device.

In one example, a method includes receiving, with a primary network device of a high-availability cluster, a first packet of a packet flow, the first packet having a first sequence number, receiving, with the primary network device, a second packet of the packet flow, the second packet having a second sequence number, calculating a difference value comprising a difference between the second sequence number and the first sequence number, and, after determining that the difference value exceeds an update window size value associated with the packet flow, wherein the update window size value is based on a window size value associated with the packet flow and a window scale factor associated with the packet flow, sending, with the primary network device, an update message comprising the second sequence number to a backup network device of the high-availability cluster.

In another example, a primary network device of a high-availability cluster configured to operate in a cluster mode includes a network interface configured to receive a first packet of a packet flow, the first packet having a first sequence number, and to receive a second packet of the packet flow, the second packet having a second sequence number, a control unit configured to calculate a difference value comprising a difference between the second sequence number and the first sequence number, and to determine whether the difference value exceeds an update window size value associated with the packet flow, wherein the update window size value is based on a window size value associated with the packet flow and a window scale factor associated with the packet flow, and a backup device network interface configured to send an update message comprising the second sequence number to a backup network device of the high-availability cluster.

In another example, a computer-readable storage medium, such as a computer-readable storage medium, contains, e.g., is encoded with, instructions that cause a programmable processor of a primary network device of a high-availability cluster to calculate an update window size value associated with a packet flow based on a window size value associated with the packet flow and a window scale factor associated with the packet flow, receive a first packet of the packet flow, the first packet having a first sequence number, receive a second packet of the packet flow, the second packet having a second sequence number, calculate a difference value comprising a difference between the second sequence number and the first sequence number, determine whether the difference value exceeds the update window, and send an update message comprising the second sequence number to a backup network device of the high-availability cluster when the difference value is determined to exceed the update window.

In another example, a method includes receiving, with a backup network device of a high-availability cluster, an update message from a primary network device of the high-availability cluster, wherein the update message comprises a sequence number of a packet of a packet flow, receiving, with the backup network device, a message indicating that the backup network device is to become active and act as a primary network device, after becoming active, sending, with the backup network device, probe packets to a client device of the packet flow and a server device of the packet flow, wherein the probe packets each comprise a probe sequence number equal to the sequence number of the packet of the packet flow, receiving, with the backup network device, at least one of a retransmission comprising a current sequence number from the client device or an acknowledgement message comprising the current sequence number from the server device, and associating the current sequence number received from the retransmission or the acknowledgement message with the packet flow.

In another example, a backup network device of a high-availability cluster configured to operate in a cluster mode includes a primary network device interface configured to receive an update message from a primary network device of the high-availability cluster, wherein the update message comprises a sequence number of a packet of a packet flow, and to receive an activate message indicating that the backup network device is to become active and act as a primary network device, one or more network interfaces configured to send probe packets to a client device of the packet flow and a server device of the packet flow, wherein the probe packets each comprise a probe sequence number equal to the sequence number of the packet of the packet flow, and to receive at least one of a retransmission comprising a current sequence number from the client device or an acknowledgement message comprising the current sequence number from the server device, and a control unit configured to cause the backup network device to become active in response to the activate message and to associate the current sequence number received from the retransmission or the acknowledgement message with the packet flow.

In another example, a computer-readable storage medium is encoded with instructions that cause a programmable processor of a backup network device of a high-availability cluster to receive an update message from a primary network device of the high-availability cluster, wherein the update message comprises a sequence number of a packet of a packet flow, receive a message indicating that the backup network device is to become active and act as a primary network device, after becoming active, send probe packets to a client device of the packet flow and a server device of the packet flow, wherein the probe packets each comprise a probe sequence number equal to the sequence number of the packet of the packet flow, receive at least one of a retransmission comprising a current sequence number from the client device or an acknowledgement message comprising the current sequence number from the server device, and associate the current sequence number received from the retransmission or the acknowledgement message with the packet flow.

In another example, a system includes a primary network device configured to receive a first packet of a packet flow, the first packet having a first sequence number, and to receive a second packet of the packet flow, the second packet having a second sequence number, to calculate a difference value comprising a difference between the second sequence number and the first sequence number, and to determine whether the difference value exceeds an update window size value associated with the packet flow, wherein the update window size value is based on a window size value associated with the packet flow and a window scale factor associated with the packet flow, and a backup network device configured to receive an update message from the primary network device, wherein the update message comprises the second sequence number, and to receive an activate message indicating that the backup network device is to become active and act as a primary network device, to send probe packets to a client device of the packet flow and a server device of the packet flow, wherein the probe packets each comprise a probe sequence number equal to the sequence number of the packet of the packet flow, to receive at least one of a retransmission comprising a current sequence number from the client device or an acknowledgement message comprising the current sequence number from the server device, and to become active in response to the activate message and to associate the current sequence number received from the retransmission or the acknowledgement message with the packet flow, wherein the primary network device is configured to send the update message comprising the second sequence number to the backup network device.

The techniques of this disclosure may provide one or more advantages. For example, by implementing these techniques, a primary device is able to synchronize TCP sequence numbers with a backup device in a high-availability network environment without overwhelming the backup device with sequence number updates. These techniques enable the primary device to periodically synchronize TCP sequence numbers of a packet flow with the backup device, without becoming overloaded by updating the backup device with every new TCP sequence number. Because the periodicity with which the primary device synchronizes TCP sequence numbers with the backup device adapts according to individual packet flow characteristics, the primary device may synchronize TCP sequence numbers of different packet flows at different times. Likewise, upon failover, the backup device may avoid initiating a session restart, because the backup device will have been updated recently enough that the backup device need only send probe packets to endpoints of the packet flow that are within a range that is not likely to be blocked by other security devices and that will likely trigger a retransmission or acknowledgement. In this manner, the techniques of this disclosure enable stateful awareness and session preservation in a high-availability cluster of primary and backup network devices.

The details of one or more examples are set forth in the accompanying drawings and the description below. Other features, objects, and advantages will be apparent from the description and drawings, and from the claims.

DETAILED DESCRIPTION

Figure 1:
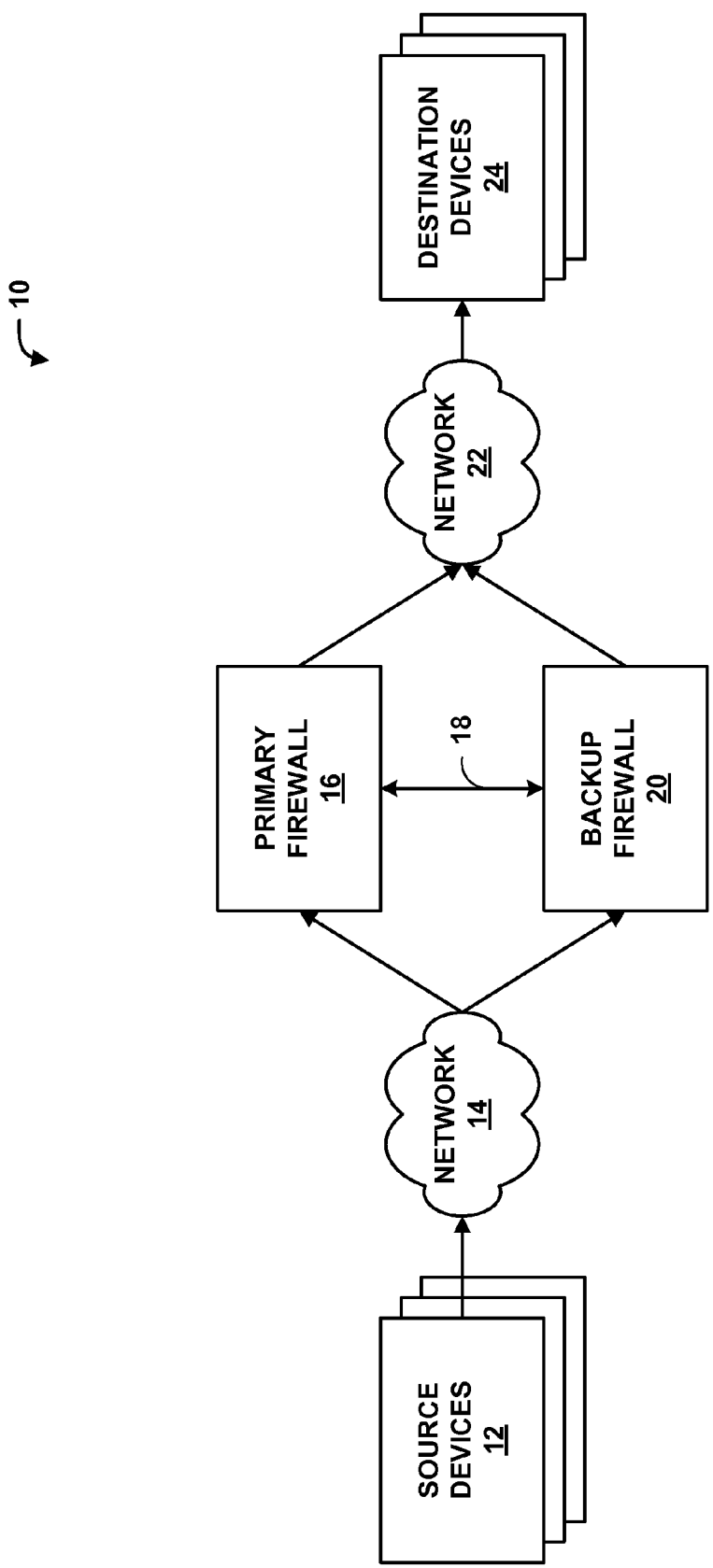
FIG. 1 is a block diagram illustrating an example system in which a primary firewall adaptively maintains transmission control protocol (TCP) session sequence numbers for network sessions between source devices and destination devices with a backup firewall.

FIG. 1 is a block diagram illustrating an example system 10 in which primary firewall 16 adaptively maintains transmission control protocol (TCP) session sequence numbers for network sessions between source devices 12 and destination devices 24 with backup firewall 20. In general, primary firewall 16 performs stateful inspection of packet flows between source devices 12 and destination devices 24. Each of source devices 12 may establish a network session with one or more of destination devices 24, and each of destination devices 24 may establish a network session with one or more of source devices 12. The term "packet flow" refers to a set of packets originating from a particular one of source devices 12 and sent to a particular one of destination devices 24 as part of a network session between the one of source devices 12 and the one of destination devices 24. A set of packets originating from a particular one of destination devices 24 and sent to a particular one of source devices 12 as part of a corresponding network session also forms a packet flow. Source devices 12 are also referred to as "clients" and destination devices 24 are also referred to as "servers," in some contexts. Details of the transmission control protocol can be found in RFC 793, "Transmission Control Protocol," by Information Sciences Institute, University of Southern California, September 1981, the entire contents of which are incorporated by reference in their entirety.

In general, a network session comprises two packet flows between two devices, each of the packet flows being in opposite directions. Sequence numbers of a first packet flow of a network session are typically not related to sequence numbers of a second packet flow of the network session. Therefore, in one example, primary firewall 16 sends sequence number updates to backup firewall 20 for a particular packet flow, and not necessarily for the network session. That is, primary firewall 16 generally sends sequence number updates to backup firewall 20 for each packet flow of a network session independently of the other packet flow. However, in some examples, primary firewall 16 sends updates for each of two packet flows of a network session simultaneously.

In the example of FIG. 1, source devices 12 are coupled to primary firewall 16 and backup firewall 20 via network 14, and primary firewall 16 and backup firewall 20 are coupled to destination devices 24 via network 22. In other examples, any or all of source devices 12 may be coupled to primary firewall 16 and backup firewall 20 directly or through other networks similar to network 14. In general, network 14 and network 22 comprise one or more network devices, such as, for example, routers, switches, bridges, gateways, hubs, or security devices. Primary firewall 16 and backup firewall 20 are also coupled via data link 18. In the example of FIG. 1, primary firewall 16 and backup firewall 20 are directly coupled via data link 18. In other examples, however, primary firewall 16 and backup firewall 20 are coupled via intermediate network devices.

For purposes of explanation, it is assumed that network 14 comprises a router or switch that directs traffic to either primary firewall 16 and/or backup firewall 20. In one example, a switch at the edge of network 14 directs packet flows through primary firewall 16 while primary firewall 16 remains active. When primary firewall 16 switches over or fails over to backup firewall 20, the switch updates forwarding information such that network traffic is directed to backup firewall 20, instead of primary firewall 16. Primary firewall 16 may restart, recover from an error, be replaced, or otherwise become active again, in which case primary firewall 16 becomes active and primary, and backup firewall 20 may revert to acting as a backup, rather than as the primary. Accordingly, after primary firewall 16 becomes active again, the switch again updates the forwarding information such that network traffic is directed to primary firewall 16, rather than backup firewall 20.

Primary firewall 16 and backup firewall 20 form a high availability cluster. Accordingly, primary firewall 16 and backup firewall 20 are configured in "cluster mode." In general, traffic that passes through a high-availability cluster establishes an active session on a primary node, e.g., primary firewall 16, and the primary node establishes a backup session on a backup node, e.g., backup firewall 20, and synchronizes the active session to the backup node. The term "high availability" generally refers to network devices or services that are "always on," that is, that are reliable, provide error detection and recoverability, and provide continuous operation. In the example of FIG. 1, backup firewall 20 performs as a primary firewall when primary firewall 16 encounters an error or otherwise goes offline. That is, primary firewall 16 fails over or switches over to backup firewall 20, in the event of an error or an event that causes primary firewall 16 to go offline. For example, primary firewall 16 may switchover to backup firewall 20 to perform a software update that requires a restart.

As stated above, primary firewall 16 and backup firewall 20 perform stateful inspection of packet flows between source devices 12 and destination devices 24. That is, primary firewall 16 keeps track of TCP sequence numbers for the network sessions with which the packet flows are associated. In this manner, primary firewall 16 is able to detect malicious traffic, e.g., "man in the middle" attacks that occur when an imposter network device attempts to interject packets into an existing packet flow. That is, primary firewall 16 is able to detect packets that are far out of sequence or that do not correspond to the proper TCP state of the network session.

In order for backup firewall 20 to become active after primary firewall 16 performs a switchover or failover, backup firewall 20 must be aware of the TCP sequence numbers of each active network session. Because of the high availability nature of primary firewall 16 and backup firewall 20, the techniques of this disclosure aim to prevent a restart of any network session associated with packet flows being inspected by primary firewall 16 upon a switchover or failover to a backup firewall 20. However, configuring primary firewall 16 to send a TCP sequence number update for each new communication of each packet flow would consume far too many network and computational resources. Therefore, the techniques of this disclosure comprise periodically sending TCP sequence number updates from primary firewall 16 to backup firewall 20.

Moreover, the techniques of this disclosure comprise adaptively modifying the periodicity with which primary firewall 16 sends TCP sequence number updates to backup firewall 20, e.g., based on characteristics of the network session and/or packet flow. That is, for each packet flow inspected by primary firewall 16, primary firewall 16 determines a different periodicity with which to send TCP sequence number updates to backup firewall 20. In general, primary firewall 16 attempts to send updates to backup firewall 20 frequently enough for each packet flow such that a network session associated with the packet flow need not close and restart, but instead that backup firewall 20 may send probe packets to the one of source network devices 12 and the one of destination network devices 24 participating in the network session to request retransmission of only recent packets of the packet flow. In one example, "recent" packets of a packet flow are those occurring after the most recent TCP sequence number update received by backup firewall 20 from primary firewall 16.

Primary firewall 16 stores a TCP window size value for each packet flow, which primary firewall 16 determines from initial packets of the packet flow, used for initiating a network session (e.g., packets of the TCP three-way handshake). In general, the TCP window size describes local buffers of clients and servers used to send/receive TCP packets. Accordingly, the TCP window size value may also be referred to as a "send/receive window size." In one example, for each packet flow, primary firewall 16 also maintains an update window value, which primary firewall 16 uses to determine the periodicity of TCP sequence number updates for the respective packet flow. Primary firewall 16 calculates the update window size value based on the TCP window size value and a TCP scale factor of the particular packet flow. Because the window size may differ for each packet flow, the update window size value may be different for each packet flow.

Accordingly, the techniques of this disclosure are considered "adaptive" in that the update window size for synchronizing sequence numbers between the primary firewall 16 and backup firewall 20 for an individual packet flow processed by primary firewall 16 "adapts" to the TCP window size for that packet flow, and because the update window size is modified when the TCP window size of the packet flow changes. That is, the update window size value adapts to different TCP connections/sessions. Likewise, different TCP parameters cause different update window size values. Because network devices can send or receive packets in one TCP window, setting the update window according to the TCP window size may be preferred. Moreover, the TCP window size can change during a network session, so the update window size adapts to the TCP window as it changes. Messages are exchanged between primary firewall 16 and backup firewall 20 to synchronize the TCP window size as the window size changes. However, in some examples, the update window size value is fixed to the value of the initial TCP window, rather than fluctuating when the TCP window size changes, to avoid exchanging additional control messages between primary firewall 16 and backup firewall 20 to synchronize the size of the TCP window.

In one example, primary firewall 16 sends a TCP sequence number update to backup firewall 20 via data link 18 for a particular packet flow when the difference between the current sequence number and the sequence number of the last update is greater than the update window value. In another example, primary firewall 16 maintains a counter or other accumulator data object that tracks the number of TCP sequence numbers that have been seen for a particular packet flow since a last TCP sequence number update and, when the counter exceeds the value of the update window, primary firewall 16 sends a TCP sequence number update to backup firewall 20 and clears the counter.

Although described primarily with respect to stateful firewalls for the purposes of explanation, the techniques of this disclosure may be applied to any pair of primary/backup network elements in which sequence number awareness is needed. For example, other security devices, such as intrusion detection or intrusion prevention devices, may perform the techniques of this disclosure. As another example, primary and backup control units of a high-availability router may perform these techniques with respect to TCP-based routing sessions between the primary control unit and peer routers. In general, the techniques may be applied to separate primary and backup devices, or primary and backup components within a single device or chassis.

If primary firewall 16 were not to synchronize sequence numbers for the monitored packet flows with backup firewall 20, backup firewall 20 might break the sequence number check upon a failover or switchover. However, these techniques provide backup firewall 20 with sufficient sequence information to obtain current sequence numbers for each monitored packet flow. Accordingly, backup firewall 20 may avoid breaking the sequence number check upon a failover or switchover. In this manner, backup firewall 20 may avoid breaking the sequence number check after a switchover or failover. Moreover, backup firewall 20 can forward packets that pass the sequence number check and drop packets that fail the sequence number check, and perform the sequence number check accurately.

In one example, a method includes receiving, with a primary network device of a high-availability cluster, a first packet of a packet flow, the first packet having a first sequence number, receiving, with the primary network device, a second packet of the packet flow, the second packet having a second sequence number, calculating a difference value comprising a difference between the second sequence number and the first sequence number, and, after determining that the difference value exceeds an update window size value associated with the packet flow, wherein the update window size value is based on a window size value associated with the packet flow and a window scale factor associated with the packet flow, sending, with the primary network device, an update message comprising the second sequence number to a backup network device of the high-availability cluster.

In general, the techniques of this disclosure are described with respect to a single packet flow, for purposes of explanation. However, it should be understood that, in general, a primary firewall inspects packets of a plurality of packet flows. Therefore, the method described above may be applied to a second, different packet flow by the primary network device. Accordingly, the method described above may further include receiving a third packet of a second packet flow, the third packet having a third sequence number, receiving a fourth packet of the second packet flow, the fourth packet having a fourth sequence number, calculating a second difference value comprising a difference between the fourth sequence number and the third sequence number, and, after determining that the second difference value exceeds a second update window size value associated with the second packet flow, wherein the second update window size value is based on a second window size value associated with the second packet flow and a second window scale factor associated with the second packet flow, sending a second update message comprising the fourth sequence number to the backup network device, wherein the second update message is associated with the second packet flow.

Figure 2:
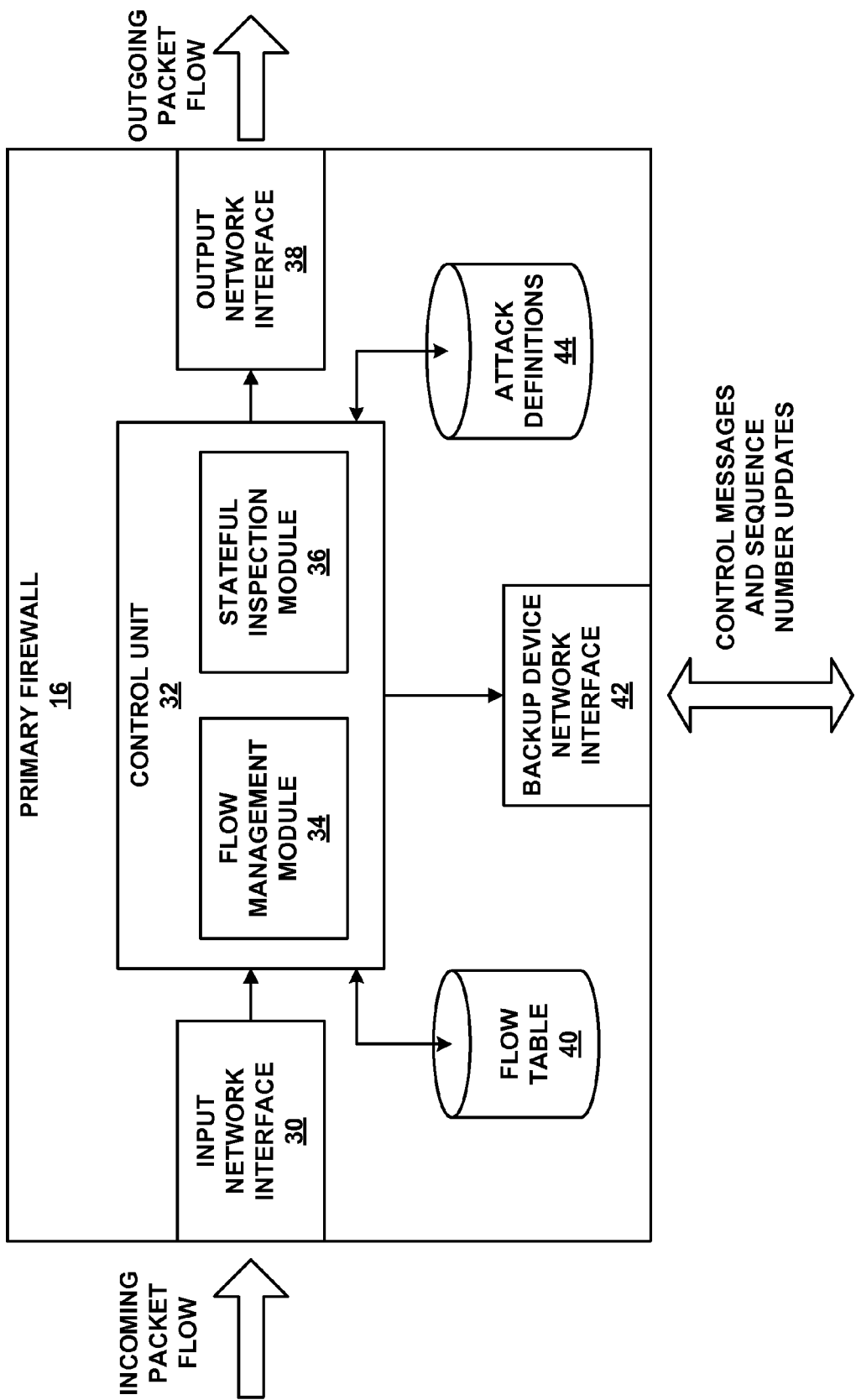
FIG. 2 is a block diagram illustrating an example arrangement of components of a primary firewall.

FIG. 2 is a block diagram illustrating an example arrangement of components of primary firewall 16 (FIG. 1). Backup firewall 20 may comprise components similar to those described with respect to FIG. 2. In the example of FIG. 2, primary firewall 16 comprises input network interface 30, control unit 32, flow management module 34, stateful inspection module 36, output network interface 38, flow table 40, backup network device interface 42, and attack definitions 44. Although three distinct network interfaces are depicted in the example of FIG. 2, other examples may include a single network interface that performs the functions attributed to input network interface 30, output network interface 38, and/or backup device network interface 42.

Primary firewall 16 comprises control unit 32 that executes flow management module 34 and stateful inspection module 36. Control unit 32 may comprise any combination of hardware, firmware, and/or software for performing the functions attributed to control unit 32. For example, control unit 32 may comprise a programmable processor that executes instructions stored in a computer-readable storage medium. Primary firewall 16 may comprise a computer-readable storage medium encoded with instructions for flow management module 34 and/or stateful inspection module 36. Alternatively, flow management module 34 and/or stateful inspection module 36 may comprise discrete hardware units, such as digital signal processors (DSPs), application specific integrated circuits (ASICs), field programmable gate arrays (FPGAs), or any other equivalent integrated or discrete logic circuitry, or any combination of hardware, firmware, and/or software.

In general, flow management module 34 determines, for packets received via input network interface 30, a packet flow to which the packets belong and characteristics of the packet flow. Flow management module 34 also provides sequence number updates to backup firewall 20 for each packet flow. That is, for each packet flow, flow management module 34 calculates an update window and, when a current sequence number exceeds the update window, flow management module 34 sends a sequence number update including the current sequence number to backup firewall 20 via backup device network interface 42.

Flow management module 34 maintains flow table 40, which includes parameters of each packet flow monitored by primary firewall 16. As described in greater detail with respect to the example of FIG. 3 below, flow table 40, in one example, includes entries for each packet flow that include information such as packet flow identifying information, such as the five-tuple {source IP address, destination IP address, source port, destination port, protocol}, a TCP window size value, a TCP window scale factor, an indication of the sequence number of the last sequence number update, and an indication of the current sequence number of the packet flow. That is, in some examples, flow table 40 includes an entry for each packet flow monitored by primary firewall 20.

In some examples, flow table 40 stores a plurality of transmission control blocks (TCBs) for the packet flows, where each TCB stores data for a corresponding packet flow. Accordingly, in such examples, flow table 40 includes two TCBs for a network session, where a network session comprises two packet flows in opposite directions and the two TCBs are each mapped to one of the packet flows of the session. In general, a client and a server are not aware of TCBs stored by primary firewall 16. Such an arrangement forms two "wings" of the packet flow: a first wing between the client of the packet flow and primary firewall 16 and a second, different wing between primary firewall 16 and the server of the packet flow. The first wing is used to match traffic from client to server, and the second wing is used to match traffic from server to client. Client-to-server direction packet flow information is kept on the first wing by a first TCB, and server-to-client direction packet flow information is kept on the second wing by a second TCB. Primary firewall 16 uses a session having two TCBs to track the state of the connection being processed by primary firewall 16.

In some examples, flow management module 34 further maintains a sequence number counter that counts the number of sequence numbers that have been received for a packet flow since a previous sequence number update was sent to backup firewall 20 and, when the counter exceeds the update window, flow management module 34 sends a sequence number update to backup firewall 20 and clears the counter. In some examples, the sequence number counter is an entry in flow table 40. In other examples, flow management module 34 calculates a difference between the current sequence number of the packet flow and a sequence number of a last update sent to backup firewall 20 and compares the difference to the update window. When the difference exceeds the window, flow management module 34 sends a sequence number update to backup firewall 20 and updates the value of the last updated sequence number by setting the last updated sequence number value equal to the current sequence number.

When primary firewall 16 receives a new packet flow, flow management module 34 extracts data from packets forming a three-way handshake of the packet flow to create a new entry in flow table 40. The three-way handshake generally includes a synchronization (SYN) packet from a client to a server, a synchronization-acknowledgement (SYN-ACK) packet from the server to the client, and an acknowledgement (ACK) packet from the client to the server. These packets also include session information, such as a TCP window size, TCP scale factor, initial sequence numbers for both the client (in the SYN packet) and the server (in the SYN-ACK packet), and a maximum segment size value. Flow management module 34 extracts this information from the three-way handshake packets of the packet flow and stores the information in the corresponding entry of flow table 40. Flow management module 34 updates the entry corresponding to a packet flow when parameters for the packet flow, such as the TCP window size, change.

Backup firewall 20 also includes a local flow table similar to flow table 40. When flow management module 34 determines that a received packet forms part of a new packet flow, flow management module 34 sends the extracted information from the three-way handshake packets of the new packet flow to backup firewall 20 via data link 18. Backup firewall 20 creates a new entry for the new packet flow in the local flow table using data received from flow management module 34 of primary firewall 16. This information also includes the initial sequence number of the packet flow. When backup firewall 20 receives sequence number updates from primary firewall 16, backup firewall 20 updates a current sequence number value of a corresponding entry in the local flow table.

When primary firewall 16 switches over or fails over to backup firewall 20, backup firewall 20 can determine the current sequence number by sending one or more probe packets to the client and the server. Backup firewall 20 initially sends probe packets for each packet flow to the client and the server of the packet flow, where the probe packets include the last updated sequence number received from primary firewall 16 for the packet flow. Backup firewall 20 then awaits either an acknowledgement of the probe packet (from the server) or a retransmission of a packet (from the client) for a period of time, e.g., 100 ms. If the time expires without receiving an acknowledgement or retransmission, backup firewall 20 sends a new probe packet having a sequence number that is one maximum segment size greater than the sequence number of the previous probe packet. Backup firewall 20 continues sending such probe packets until either receiving a retransmission or acknowledgement in response to the probe packet, or until the difference between the sequence number of the probe packet and the last updated sequence number received from primary firewall 16 exceeds the update window size. In some examples, when the difference between the sequence number of the probe packet and the last updated sequence number exceeds the update window size, backup firewall 20 causes the corresponding network session to restart. In some examples, the client and/or the server of the network session restarts the network session, because a TCP timeout may occur before backup firewall 20 can begin inspecting and forwarding packets from the client to the server.

Stateful inspection module 36 of primary firewall 16 performs stateful inspection of packets received of each packet flow monitored by primary firewall 16. For example, stateful inspection module 36 verifies that received packets have sequence numbers that are within a particular range. Stateful inspection module 36 drops packets with sequence numbers outside of an acceptable range for the packet flow, e.g., to prevent man in the middle attacks or other network attacks that can be detected using sequence numbers. Stateful inspection module 36 also detects attacks in packets of each packet flow by analyzing the packets using attack definitions 44. Attack definitions 44 define one or more attacks, e.g., in the form of attack signatures. Attack definitions 44, in some examples, also define protocol signatures by which stateful inspection module 36 decodes a protocol for a packet flow for protocol-specific attack detection.

When stateful inspection module 36 determines that one or more packets of a packet flow represent a network attack according to attack definitions 44, stateful inspection module 36 performs one or more programmed responses. The programmed response may comprise, for example, dropping the attack packets, rate-limiting the packet flow, closing a network session associated with the packet flow, sending a close session message to either the client or the server of the network session, blocking future network connection requests by either the client or the server (permanently or for a defined period of time), or advertising the IP address of either or both of the client or server to other network devices to cause those network devices to block network sessions of the client or server and/or to close current network sessions of the client or server. When stateful inspection module 36 determines that a packet of a packet flow does not represent a network attack, stateful inspection module 36 passes the packet to output network interface 38, and the packet is forwarded toward the destination of the packet flow.

In some examples, stateful inspection module 36 is configured to perform deep packet inspection (DPI) of packets of packet flows inspected by primary firewall 16. In some examples, stateful inspection module 36 is configured to act as an application layer gateway (ALG). In such examples, stateful inspection module 36 acts as a TCP proxy for packet flows to perform DPI and/or act as an ALG, whereby stateful inspection module 36 intercepts and analyzes TCP traffic. In particular, when stateful inspection engine 36 receives a packet from a client of a network session, stateful inspection engine 36 sends an acknowledgement of the packet to the client, inspects the packet, and, if the packet does not represent a network attack, forwards the packet to the server of the network session. Likewise, when stateful inspection engine 36 receives a packet from the server of the network session, stateful inspection engine 36 acknowledges the packet to the server, inspects the packet, and, if the packet does not represent a network attack, forwards the packet to the client. In general, a TCP proxy is created when necessary to inspect TCP traffic, therefore, not every TCP session requires a TCP proxy.

When stateful inspection module 36 acts as a proxy in this manner, the process should not be visible to the client or the server. That is, the process of acting as a proxy should be transparent to both the client and the server of the network session. In some examples, stateful inspection module 36 may not act as a TCP proxy for all packet flows or network sessions. That is, stateful inspection module 36 may act as a TCP proxy for some network sessions but not for others.

As described above, a packet flow may comprise two "wings" and two TCBs. When a TCP proxy exists for a network session, the TCP traffic that matches the first wing (that is, the client-to-server information of the network session) is sent to the first TCB, and is acknowledged by the first TCB. The first TCB forwards the traffic to the second TCB after the traffic is analyzed to identify network attacks in the traffic, and the second TCB forwards the traffic to the server. Likewise, the second TCB acknowledges traffic in the server-to-client direction to the server, forwards the traffic to the first TCB after the traffic is inspected, and the first TCB forwards the traffic to the client. In this manner, the first and second TCBs can be considered two independent TCP termination points, although the client and the server should not be aware of the existence of the TCP proxy, because the TCP proxy should be transparent to the client and the server.

Figure 3:
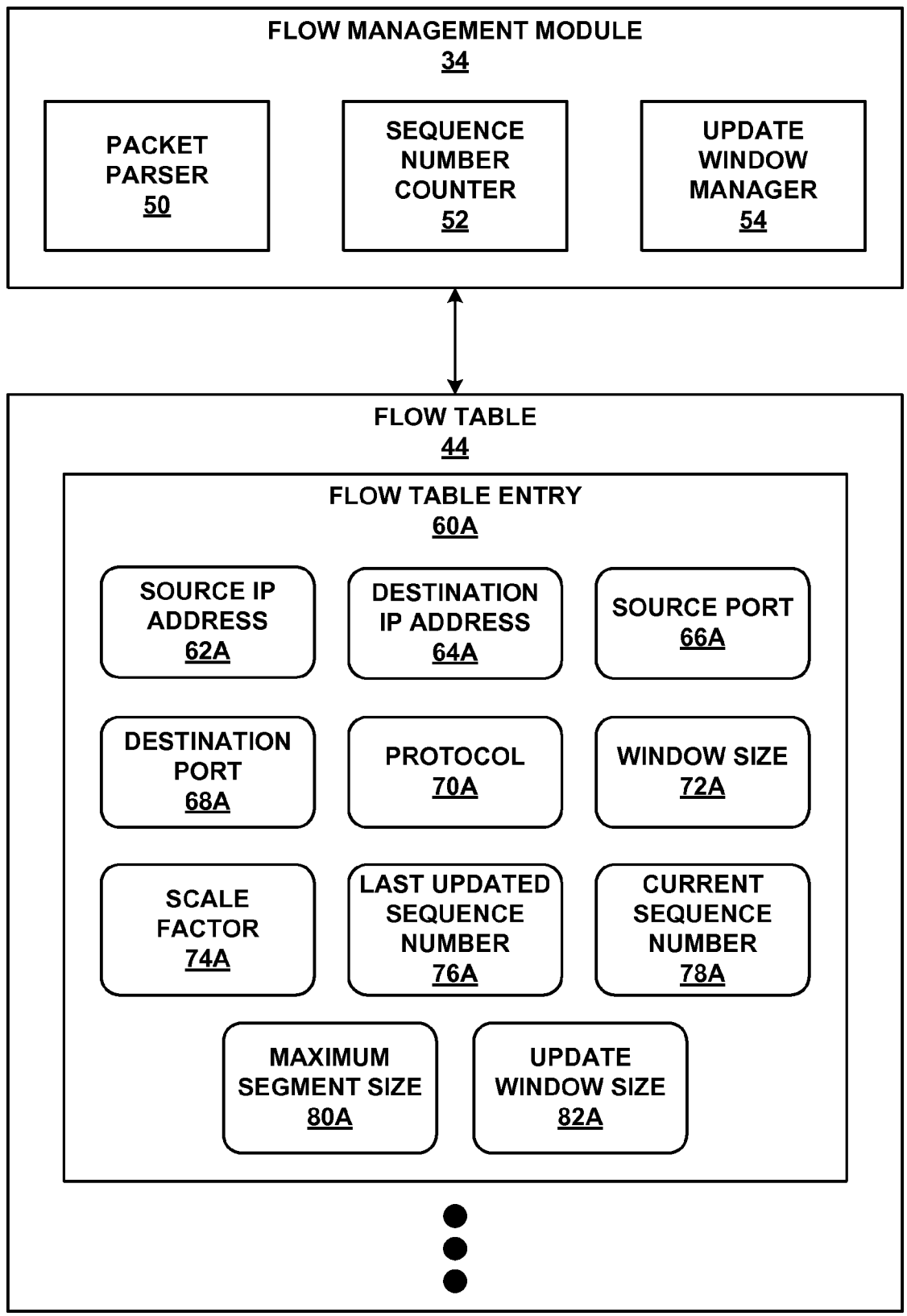
FIG. 3 is a block diagram illustrating example sub-components of a flow management module of a primary firewall and an example flow table entry in a flow table of the primary firewall.

FIG. 3 is a block diagram illustrating example sub-components of flow management module 34 and an example flow table entry 60A of flow table 40. In the example of FIG. 3, flow management module 34 comprises packet parser 50, sequence number counter 52, and update window manager 54. When flow management module 34 first receives a packet, packet parser 50 parses the packet to determine whether the packet belongs to an existing packet flow or whether the packet represents a new packet flow. Packet parser 50 determines that SYN packets and SYN-ACK packets represent new packet flows. That is, packet parser 50 checks a SYN flag of a TCP header of a packet to determine whether the packet represents a new packet flow. When the SYN flag of a packet is set (e.g., in SYN packets or in SYN-ACK packets), packet parser 50 determines that the packet represents a new packet flow. In some examples, packet parser 50 determines that a packet having a 5-tuple {source IP address, destination IP address, source port, destination port, protocol} that does not match any entries of flow table 40 also represents a new (that is, unrecognized) packet flow.

When a packet represents a new packet flow, packet parser 50 extracts information regarding the new packet flow. Flow management module 34 creates a new entry in flow table 40 for the new packet flow and stores the extracted information in the new entry. In general, flow table 40 includes a plurality of flow table entries 60, although only one entry (flow table entry 60A) is shown in FIG. 3 for purposes of explanation. Flow table entry 60A includes data representative of a respective packet flow. In this example, flow table entry 60A includes values source IP address 62A, destination IP address 64A, source port 66A, destination port 68A, protocol 70A, window size 72A, scale factor 74A, last updated sequence number 76A, current sequence number 78A, maximum segment size 80A, and update window size 82A.

Packet parser 50 extracts the source IP address, destination IP address, source port, destination port, protocol, window size, scale factor, maximum segment size, and initial sequence number from initial packets of a new network session, e.g., the SYN, SYN-ACK, and ACK packets. After creating a new entry in flow table 40 representing a new packet flow, flow management module 34 sends one or more messages to backup firewall 20 that a new packet flow has been identified. The messages also include the data used to create the new flow table entry. Accordingly, backup firewall 20 creates an entry in a flow table local to backup firewall 20 representative of the new packet flow.

When combined to form a five-tuple, the values source IP address 62A, destination IP address 64A, source port 66A, destination port 68A, and protocol 70A identify the packet flow to which flow table entry 60A corresponds. Update window manager 54 uses the values of window size 72A and scale factor 74A to calculate the update window for the packet flow corresponding to flow table entry 60A. The value of last updated sequence number 76A comprises the sequence number of the last sequence number update sent to backup firewall 20. The value of current sequence number 78A comprises the current sequence number for the packet flow corresponding to flow table entry 60A. Backup firewall 20 uses the value of maximum segment size 80A after a switchover or failover to determine sequence number increments for probe packets used to determine the current sequence number.

Update window manager 54 calculates the value of update window size 82A according to the values of window size 72A and scale factor 74A. In one example, in accordance with the TCP standard, window size 72A is a 16-bit value, and scale factor 74A is an integer value between 1 and 14, inclusive. Update window manager 54 calculates the value of update window size 82A by left-shifting the value of window size 72A according to the value of scale factor 74A. In effect, the update window size has a value that is the product of the value of window size 82A and $2^{SF}$, where SF is the value of scale factor 74A. That is, where "window_size" corresponds to the value of window size 72A and "update_window" corresponds to the calculated value of update window 82A, update window manager 54 calculates update_window using the following formula:

$$\text{update\_window} = \text{window\_size} * 2^{SF}$$

This value can also be expressed using the following formula, where the symbol "<<" represents a bitwise left shift operation that left-shifts the value of "window_size" SF times:

$$\text{update\_window} = \text{window\_size} << SF.$$

In some examples, update window manager 54 is configured to impose a minimum size on the update window. In one example, the minimum size of the update window is 64,000 sequence numbers. Therefore, if the result of the above calculations is less than 64,000, update window manager 54 sets the update window value equal to 64,000, but if the result of the above calculations is greater than 64,000, update window manager 54 sets the value of the update window equal to the result of the calculation.

Accordingly, in one example, a method for performing the techniques of this disclosure includes calculating an update window size value associated with a packet flow. Calculating the update window size value may comprise multiplying the window size value by two raised to a power equal to the window scale factor, or calculating may comprise left-shifting the window size value by the window scale factor.

When a received packet is part of an existing (that is, recognized) packet flow, packet parser 50 extracts the sequence number from the packet. Flow management module 34 stores the value of the sequence number as the value of current sequence number 78 in the corresponding one of flow table entries 60. Packet parser 50 also determines whether the packet includes a modification to the TCP window size. When the packet modifies the TCP window size, flow management module 34 recalculates the value of the update window for the packet flow and modifies the value of the update window in the corresponding entry of flow table 40. For example, when a packet of a packet flow corresponding to flow table entry 60A includes a window size update, update window manager 54 recalculates the value of update window 82A using either of the formulas described above.

For each received packet of a packet flow, sequence number counter 52 determines whether the sequence number of the packet exceeds the update window for the packet flow. In one example, for the packet flow associated with flow table entry 60A, sequence number counter 52 determines whether the difference between the value of current sequence number 78A and the value of last updated sequence number 76A exceeds the value of update window size 82A. When this difference is greater than (or equal to, in some examples) the value of update window size 82A, flow management module 34 sends a sequence number update to backup firewall 20 and sets the value of last updated sequence number 76A equal to the value of current sequence number 78A.

Figure 4:
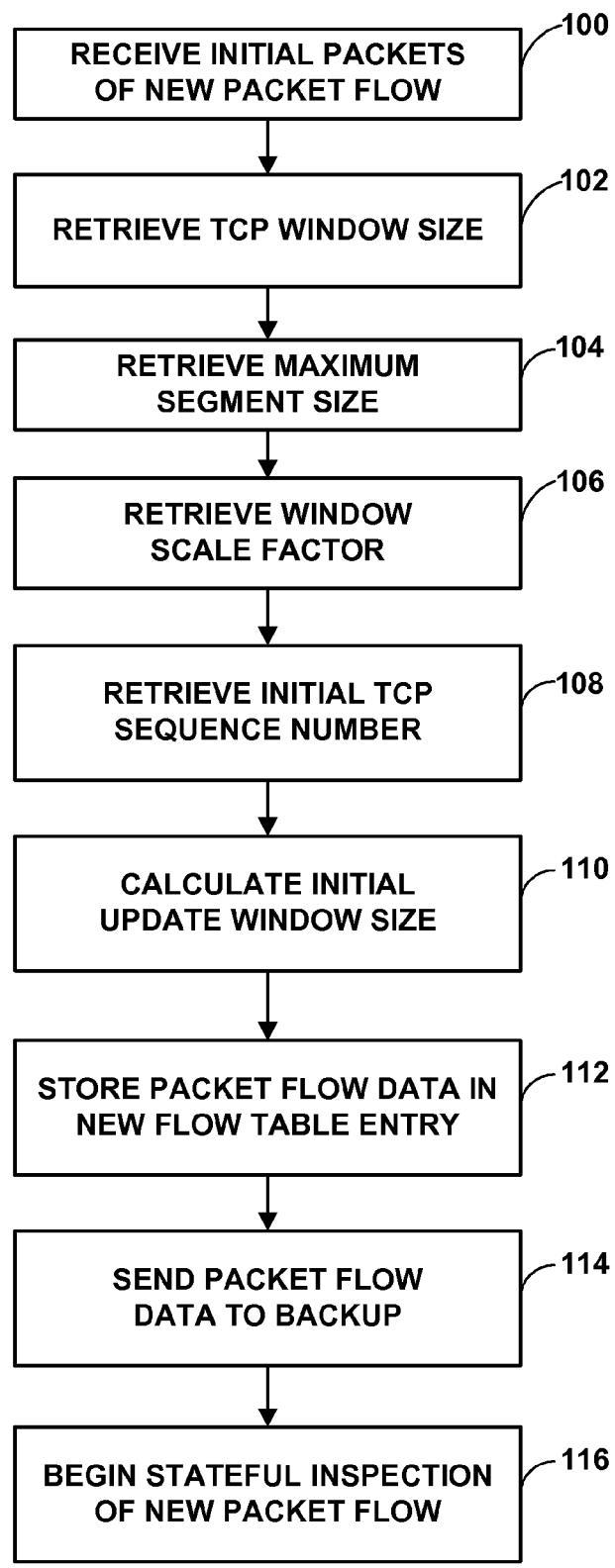
FIG. 4 is a flowchart illustrating an example method for creating a new flow table entry upon receiving a new packet flow and for initially updating a backup firewall with information for the new packet flow.

FIG. 4 is a flowchart illustrating an example method for creating a new flow table entry upon receiving a new packet flow. Initially, primary firewall 16 receives packets indicative of a new packet flow (100). In general, primary firewall 16 determines that a packet flow is a new packet flow upon receiving a SYN packet of the packet flow from a client, e.g., one of source devices 12 (FIG. 1), destined for a server, e.g., one of destination devices 24 (FIG. 1). Primary firewall 16 also receives a SYN-ACK packet from the server in response to the SYN packet, and an ACK packet from the client in response to the SYN-ACK packet. In general, the SYN, SYN-ACK, and ACK packets are referred to as the three-way handshake packets. It should be noted that the SYN packet and the SYN-ACK packet belong to different packet flows, but to the same network session. Primary firewall 16 associates the two packet flows with the same network session using source and destination IP addresses, source and destination port numbers, and a protocol of each packet flow.

In particular, packet parser 50 parses received packets to determine whether the SYN and/or ACK flags of these packets are set. Packet parser 50 determines that packets with the SYN and/or ACK flags set are three-way handshake packets. Packet parser 50 parses three-way handshake packets to determine, for the packet flows associated with the three-way handshake packets, a TCP window size (102), a maximum segment size (104), a window scale factor (106), and an initial TCP sequence number (108). Update window manager 54 calculates an initial update window size value for the packet flow (110). Flow management module 34 then creates a new entry in flow table 40 for each new packet flow and stores the retrieved and calculated packet flow data in the new entry (112).

Flow management module 34 also sends the new packet flow data, including the initial sequence numbers for the packet flows, to backup firewall 20 via backup device network interface 42 across data link 18 (114). Flow management module 34, in one example, sets the value of last updated sequence number 76A equal to the initial sequence number of the packet flow. Stateful inspection module 36 then begins stateful inspection of packets of the new packet flow (116). In some examples, stateful inspection module 36 inspects three-way handshake packets to detect attacks as well. For example, stateful inspection module 36 may prevent a SYN flood attack by blocking repeated SYN packets from a common source IP address intended for a common destination IP address.

Figure 5:
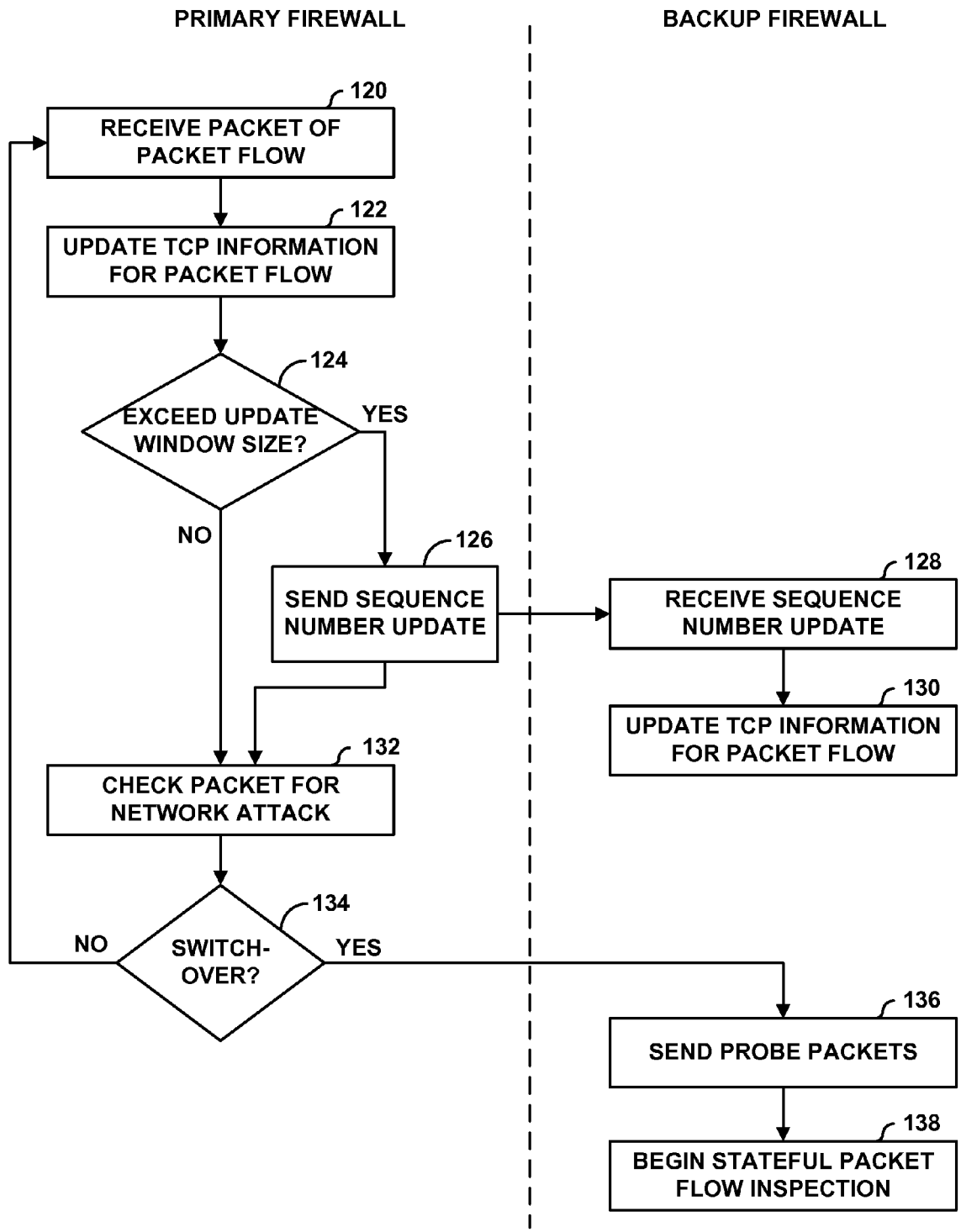
FIG. 5 is a flowchart illustrating an example method for sending sequence number updates from a primary firewall to a backup firewall.

FIG. 5 is a flowchart illustrating an example method for sending sequence number updates from primary firewall 16 to backup firewall 20. Initially, primary firewall 16 receives a packet of an existing (recognized) packet flow (120). Flow management module 34 then inspects the packet to retrieve TCP information and updates the flow table entry corresponding to the packet flow in flow table 40 based on information retrieved from the packet (122). For example, packet parser 50 extracts the current sequence number and flow management module 34 updates the current sequence number value in the flow table entry.

Packet parser 50 also parses the packet to determine whether the packet updates the TCP window size. When the packet changes the TCP window size, update window manager 54 modifies the update window size value in the corresponding entry of flow table 40. That is, update window manager 54 recalculates the value of the update window size according to the new TCP window size. In some examples, update window manager 54 also sends a control message to backup firewall 20 that includes the updated TCP window size.

Sequence number counter 52 then calculates the difference between the last updated sequence number and the current sequence number and determines whether this difference exceeds the value of the update window size (124). When the difference exceeds the update window size ("YES" branch of 124), flow management module 34 sends a sequence number update to backup firewall 20 via backup device network interface 42 across data link 18 (126). The sequence number update includes an identification of the packet flow associated with the update (e.g., the 5-tuple {source IP address, destination IP address, source port, destination port, and protocol} of the packet flow) and the current sequence number.

After receiving the sequence number update from primary firewall 16 (128), backup firewall 20 updates the TCP information associated with the packet flow (130). When backup firewall 20 receives an update message, backup firewall 20 identifies an entry in a local flow table of backup firewall 20 corresponding to the packet flow associated with the update message (e.g., using the 5-tuple {source IP address, destination IP address, source port, destination port, and protocol}) and updates the information of the local flow table entry. In particular, backup firewall 20 updates the sequence number in the local flow table entry when the update message includes an updated sequence number for the packet flow.

Primary firewall 16 also inspects the packet to determine whether the packet represents a network attack (132). In some examples, the packet inspection occurs before checking whether the calculated difference exceeds the update window size. Devices other than firewalls implementing the techniques of this disclosure may perform device-specific actions using the packet before, during, and/or after checking whether the calculated difference exceeds the update window size and performing the sequence number update.

When a switchover or failover does not occur ("NO" branch of 134), primary firewall 16 awaits another packet and then repeats the steps described above. However, when a switchover or failover occurs, backup firewall 20 becomes active as a primary firewall. Therefore, backup firewall 20 determines the current sequence numbers of each packet flow. Backup firewall 20 sends probe packets to each end of each packet flow (136) to retrieve the current sequence numbers for each packet flow. After obtaining the current sequence numbers of each packet flow, backup firewall 20 begins stateful inspection of each packet flow (138). Details of the use of probe packets to obtain the current sequence numbers are described below with respect to FIG. 6.

Figure 6:
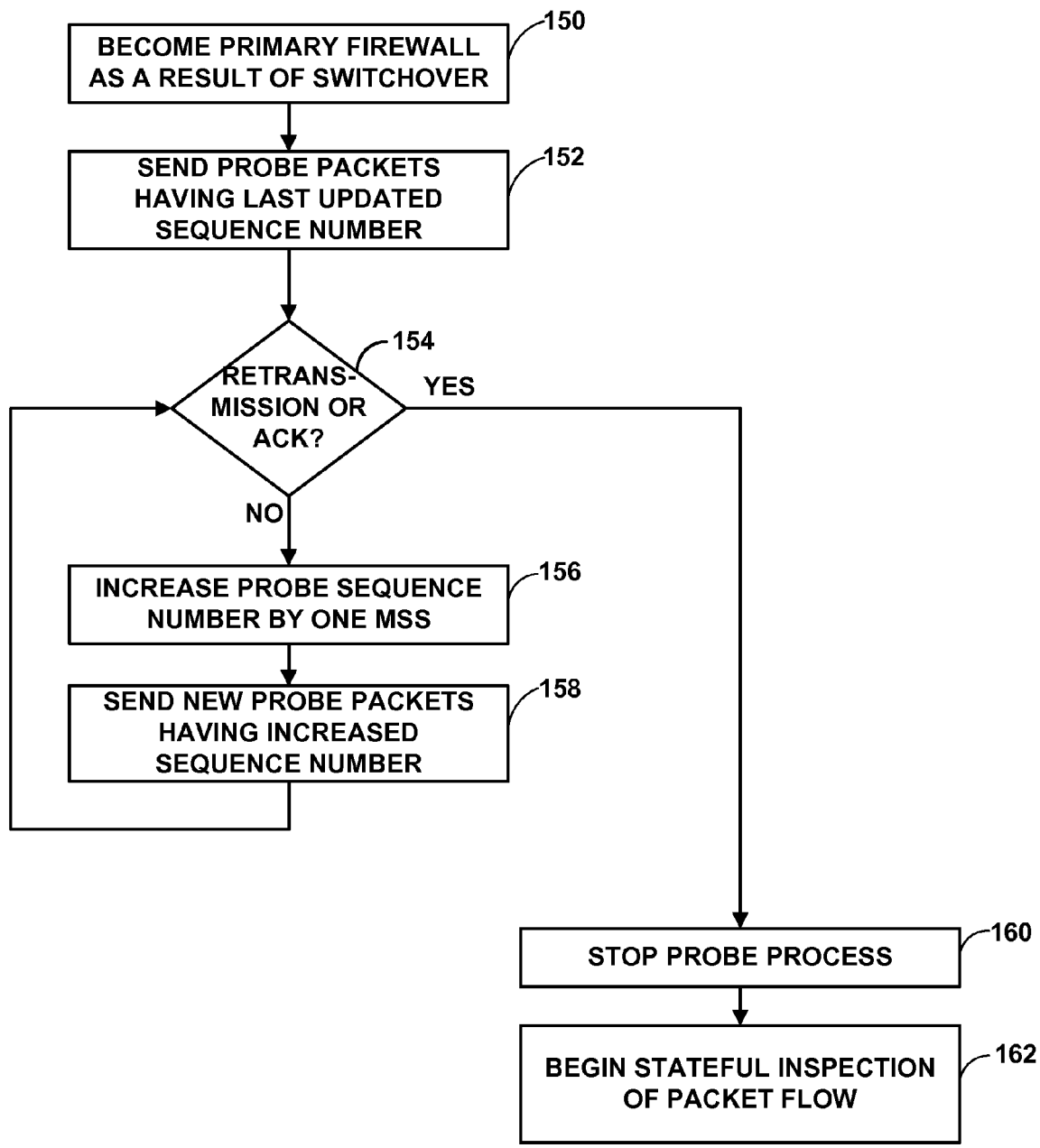
FIG. 6 is a flowchart illustrating an example method for a backup firewall to determine a current sequence number for a packet flow upon a switchover or failover.

FIG. 6 is a flowchart illustrating an example method for backup firewall 20 to determine a current sequence number for a packet flow upon a switchover or failover. Initially, primary firewall 16 switches over or fails over to backup firewall 20 (150). Thereafter, backup firewall 20 becomes active, that is, becomes a "primary" firewall. For purposes of explanation, this disclosure will continue to refer to backup firewall 20 as "backup firewall 20," although it should be understood that after the switchover or failover, backup firewall 20 acts as an active or "primary" firewall.

After the switchover or failover, in order to properly perform stateful packet inspection, backup firewall 20 obtains the current sequence numbers of each packet flow. In general, backup firewall 20 should, after a switchover or failover, resume the TCP state and continue processing TCP traffic, and should not break the TCP sequence check. This is important not only for inspection of the packet flow by backup firewall 20, but also in case other security devices lie along the network path of the packet flow, e.g., to avoid a violation of TCP sequence checks on other network devices. In accordance with the techniques of this disclosure, backup firewall 20 sends probe packets with incremental sequence number increases to learn the exact sequence number for a packet flow. The first probe packet has a sequence number equal to the last sequence number update (that is, the last synchronized TCP sequence number), and backup firewall 20 increments the sequence number of each subsequent probe packet until backup firewall 20 causes a retransmission by the client of the packet flow, or receives an acknowledgement by the server of the packet flow. In the example of FIG. 6, the factor by which backup firewall 20 increments the sequence number is the maximum segment size (MSS) of the packet flow.

This disclosure recognizes that, if another firewall lies along the network path between backup firewall 20 and the client or the server of the packet flow, this other firewall may block the probe packets if the sequence number of the probe packets is too far out of synchronization with the current sequence numbers of the packet flow. Likewise, the techniques of this disclosure seek to enable obtaining the current sequence numbers without requiring reconfiguration of other network devices along the network path of the packet flow, e.g., without reconfiguring this other hypothetical firewall to disable sequence number checks. Moreover, the techniques of this disclosure seek to avoid causing network devices in high availability clusters to perform differently than in stand-alone mode.

To obtain the current sequence number for a particular packet flow, backup firewall 20 initially sends probe packets having sequence numbers equal to the last received sequence number update from primary firewall 16 to each end of the packet flow (152). Backup firewall 20 then awaits a retransmission of the most recent packet of the packet flow from the client, or an acknowledgement from the server (154). In some examples, backup firewall 20 starts a timer upon sending a probe packet and waits until the timer expires, or until receiving a retransmission or an acknowledgement. In some examples, the timer expires after 100 milliseconds.

If the timer expires and backup firewall 20 does not receive a retransmission or an acknowledgement in response to the probe packet ("NO" branch of 154), backup firewall 20 constructs new probe packets having a sequence number that is one maximum segment size (MSS) greater than the previous probe packets (156) and sends the new probe packets to the ends of the packet flow (158). Backup firewall 20 then restarts the timer and awaits a retransmission or an acknowledgement.

When backup firewall 20 receives a retransmission or acknowledgement in response to a probe packet ("YES" branch of 154), backup firewall 20 extracts the sequence number from the retransmission (or acknowledgement) and determines that the current sequence number of the packet flow is equal to the sequence number of the retransmission (or acknowledgement). Therefore, backup firewall 20 ends the probe process (160) and begins stateful inspection of the packet flow (162). In some examples, backup firewall 20 also ends the probe process when the difference between the sequence number of the probe packet and the sequence number of the last update from primary firewall 16 exceeds the update window range. Backup firewall 20 generally performs this process for each packet flow to be monitored, in order to obtain the current sequence numbers for each of the packet flows.

In one example, a method according to FIG. 6 includes receiving, with a backup network device of a high-availability cluster, an update message from a primary network device of the high-availability cluster, wherein the update message comprises a sequence number of a packet of a packet flow, receiving, with the backup network device, a message indicating that the backup network device is to become active and act as a primary network device, after becoming active, sending, with the backup network device, probe packets to a client device of the packet flow and a server device of the packet flow, wherein the probe packets each comprise a probe sequence number equal to the sequence number of the packet of the packet flow, receiving, with the backup network device, at least one of a retransmission comprising a current sequence number from the client device or an acknowledgement message comprising the current sequence number from the server device, and associating the current sequence number received from the retransmission or the acknowledgement message with the packet flow.

The method described above with respect to the backup network device may further include receiving a maximum segment size value associated with the packet flow from the primary network device, and sending a second (or third or other subsequent) set of probe packets to the client device and the server device, wherein the second set of probe packets each comprise a second probe sequence number corresponding to the sequence number of the update message incremented by a multiple of the maximum segment size (MSS) value. The multiple of the maximum segment size is generally determined according to the cardinality of the probe packet set. That is, for probe packet N, the multiple of the MSS is equal to N−1. Thus, for the first probe packet set, the multiple of the MSS is zero (1−1=0), so the sequence number for the first set of probe packet is equal to X, where X is the value of the most recent sequence number update. For the second probe packet set, the multiple of the MSS is one (2−1=1), so the sequence number for the second set of probe packets is X+1*(MSS)=X+MSS.

Figure 7:
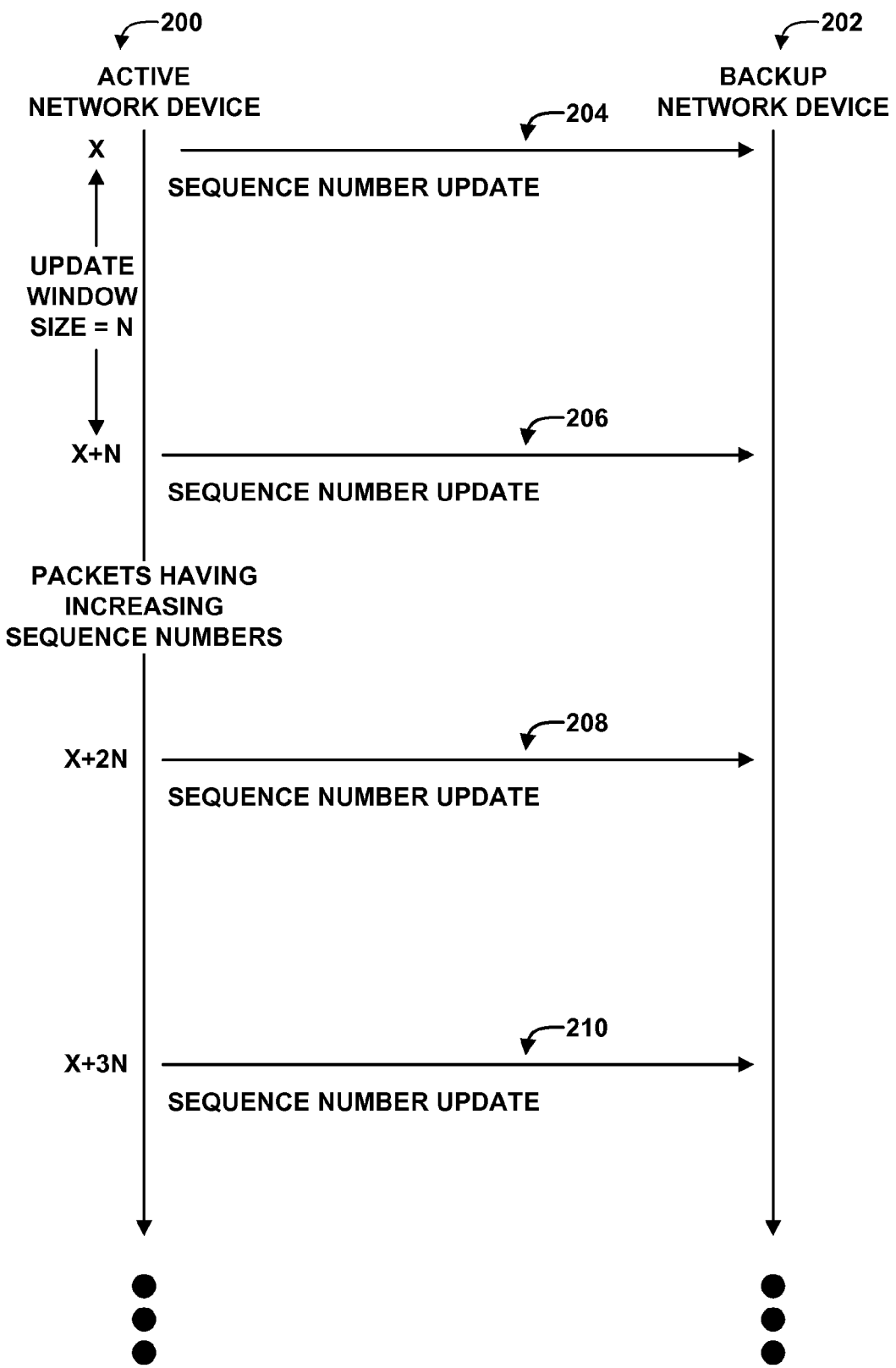
FIG. 7 is a conceptual diagram illustrating sequence number updates sent from an active network device to a backup network device.

FIG. 7 is a conceptual diagram illustrating sequence number updates sent from active network device 200 to backup network device 202, in accordance with the techniques of this disclosure. Active network device 200 may correspond to primary firewall 16, and backup network device 202 may correspond to backup firewall 20. However, as the techniques of this disclosure may be implemented by any pair of primary and backup network devices in a high-availability environment, active network device 200 and backup network device 202 need not necessarily correspond to primary and backup firewalls.

FIG. 7 depicts an example packet flow passing through active network device 200 that begins with sequence number X. The update window size for this example packet flow is N. Accordingly, active network device 200 sends sequence number updates to backup network device 202 every N sequence numbers. As illustrated in the example of FIG. 7, active network device 200 sends an initial sequence number update 204, corresponding to the initial sequence number X of the packet flow. Then, active network device 200 sends sequence number updates 206, 208, and 210 at sequence numbers X+N, X+2N, and X+3N, respectively.

If active network device 200 switched over or failed over to backup network device 202 after sequence number update 210, but before a subsequent sequence number update, backup network device 202 would begin sending probe packets with sequence number X+3N. Assuming that the maximum segment size of the packet flow is Y, backup network device 202 would send probe packets having sequence numbers X+3N, X+3N+Y, X+3N+2Y, X+3N+3Y, and so on, until backup network device 202 received a retransmission of the packet having the current sequence number or an acknowledgement from the server. FIG. 7 also illustrates that the difference between the current sequence number of an active packet flow and the last updated sequence number sent to backup network device 202 is within the update window size. Likewise, the sequence number of the backup session is generally behind the sequence number of the active session.

Figure 8A:
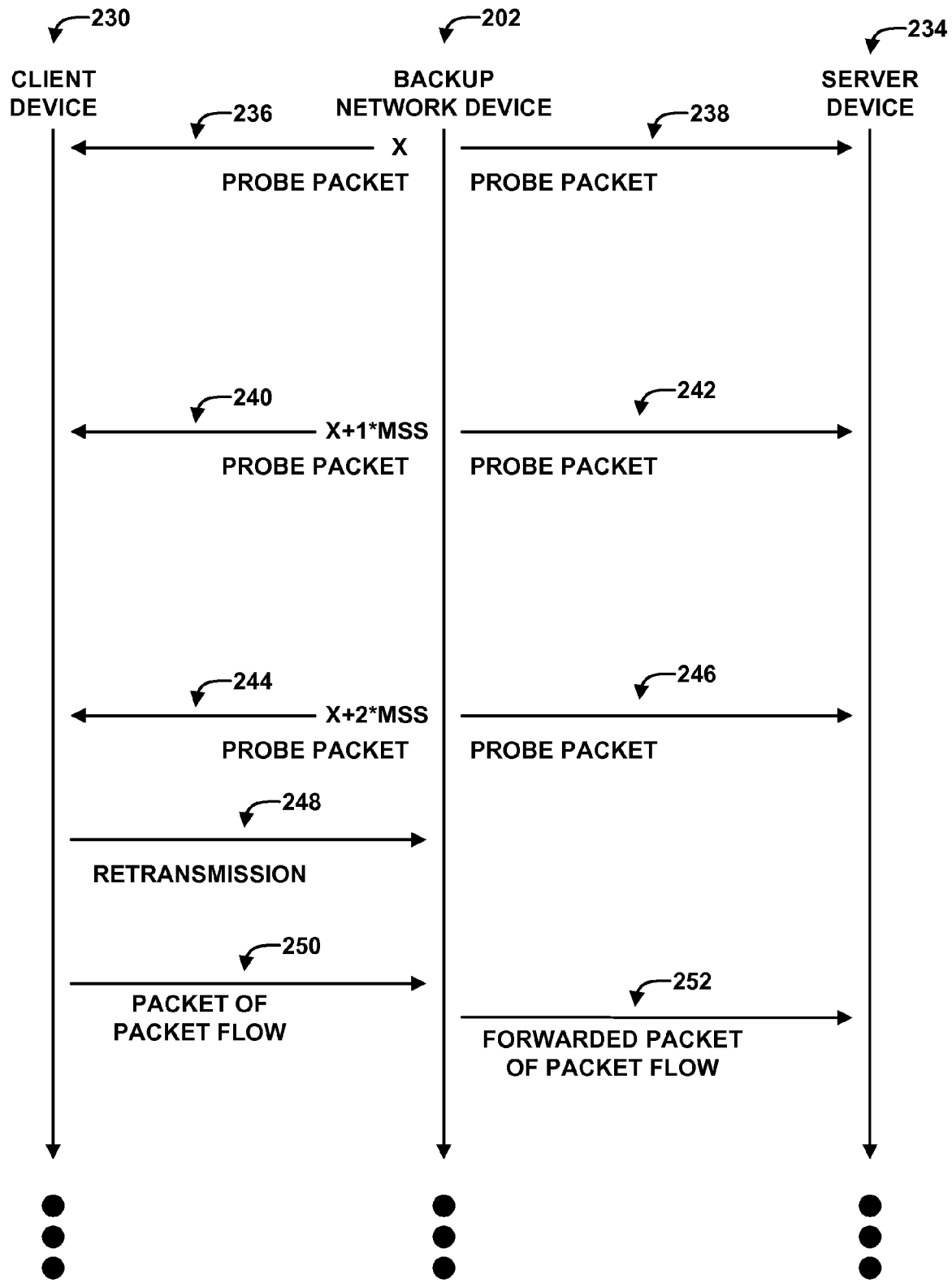
FIGS. 8A and 8B are conceptual diagrams illustrating probe packets sent from a backup network device to a client and a server of a packet flow following a switchover or failover to attempt to trigger a retransmission or an acknowledgement in order to obtain a current sequence number of the packet flow.
Figure 8B:
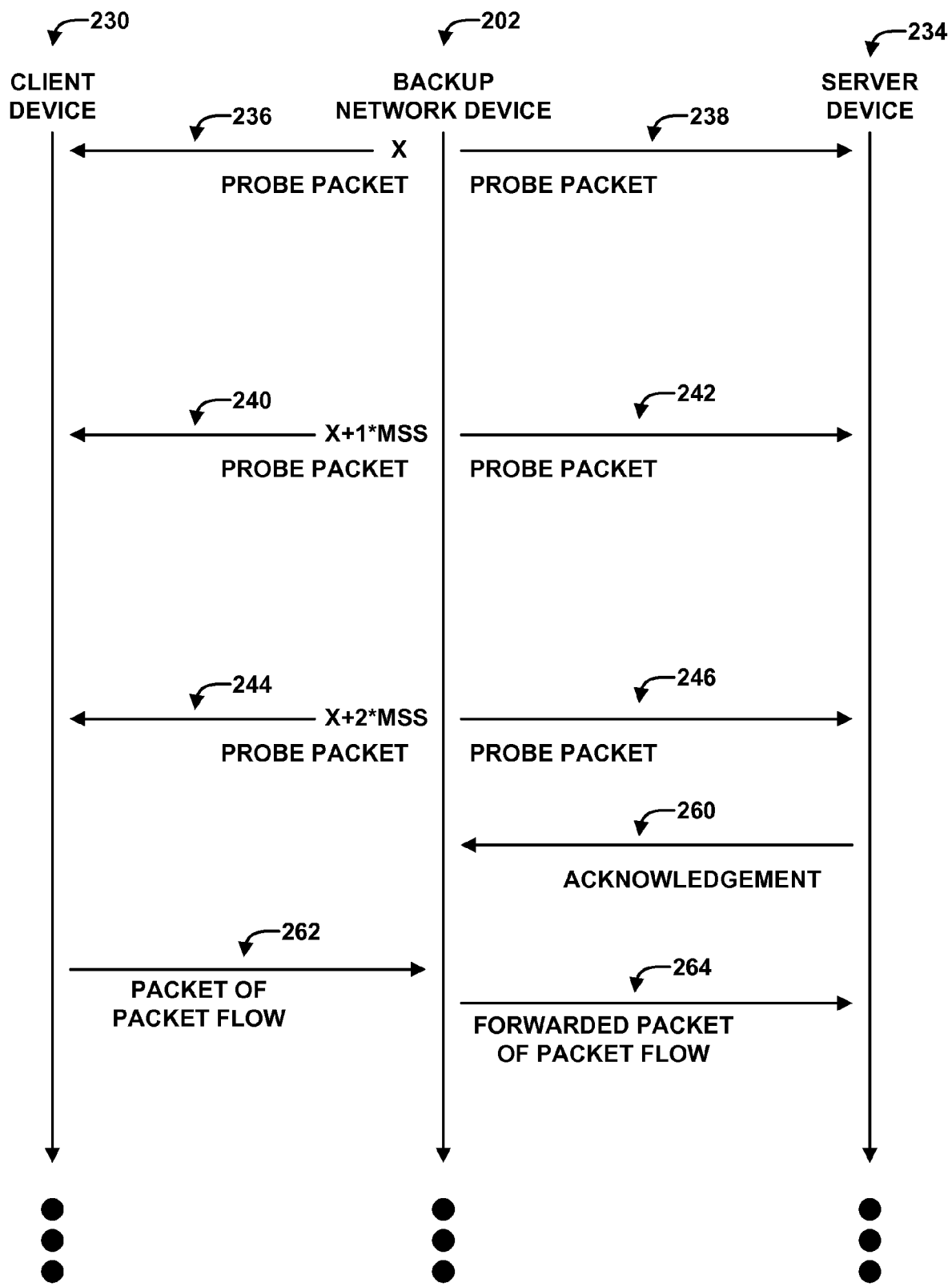

FIGS. 8A and 8B are conceptual diagrams illustrating probe packets sent from backup network device 202 to a client and a server of a packet flow following a switchover or failover to attempt to trigger a retransmission or an acknowledgement in order to obtain a current sequence number of the packet flow. In the example of FIG. 8A, the probe packets trigger a retransmission, while in the example of FIG. 8B, the probe packets trigger an acknowledgement.

In general, a packet flow exists between client device 230 and server device 234, which passes through a high-availability cluster including backup network device 202. Following a switchover or failover, backup network device 202 sends a first set of probe packets each having a sequence number X, where X is the value of the last updated sequence number received by backup network device 202 from primary network device 200. In the examples of FIG. 8, backup network device 202 sends probe packet 236 to client device 230 and probe packet 238 to server device 234, where the first set of probe packets comprises probe packets 236, 238. Probe packets 236, 238 each comprise a sequence number equal to X, in this example, where X is the value of the last sequence number update received by backup network device 202.

When neither a retransmission nor an acknowledgement is received after a period of time (e.g., 100 ms), backup network device 202 increments the sequence number for the next set of probe packets by the maximum segment size (MSS) value. In the examples of FIG. 8, the second set of probe packets includes probe packets 240, 242, each having a sequence number equal to X+1*MSS, and the third set of probe packets includes probe packets 244, 246, each having a sequence number equal to X+2*MSS.

In the example of FIG. 8A, probe packet 244 causes client device 230 to send a retransmission 248 of a packet, where the retransmitted packet includes a current sequence number. Backup network device 202 determines that the sequence number of retransmission 248 is the current sequence number for the packet flow between client device 230 and server device 234. Therefore, upon receipt of a subsequent packet 250 of the packet flow from client device 230, backup network device 202 forwards forwarded packet 252 to server device 234.

In the example of FIG. 8B, probe packet 246 causes server device 234 to send an acknowledgement 260, where the acknowledgement includes a current sequence number. Backup network device 202 determines that the sequence number of acknowledgement 260 is the current sequence number for the packet flow between client device 230 and server device 234, because an acknowledgement from a server represents the highest sequence number of a packet flow that has been received by the server. Therefore, upon receipt of a subsequent packet 262 of the packet flow from client device 230, backup network device 202 forwards forwarded packet 264 to server device 234.

Although described primarily with respect to a primary firewall and a backup firewall, the techniques of this disclosure may be implemented by any pair of network devices. That is, for any pair of network devices in which one network device acts as a primary network device and the other acts as a backup network device, the primary device may implement the techniques of this disclosure for periodically synchronizing sequence numbers between the primary network device and the backup network device. Likewise, the backup network device may use the probe techniques of this disclosure to obtain current sequence numbers for packet flows after switchover or failover from the primary network device to the backup network device.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various examples have been described. These and other examples are within the scope of the following claims.

The invention claimed is:

1. A method comprising:
  receiving, with a primary network element of a high-availability cluster, a first packet of a packet flow, the first packet having a first sequence number;
  receiving, with the primary network element, a second packet of the packet flow, the second packet having a second sequence number;
  calculating a first difference value comprising a difference between the second sequence number and the first sequence number;
  after determining that the first difference value exceeds a first update window size value associated with the packet flow, wherein the first update window size value is based on a window size value associated with the packet flow and a window scale factor associated with the packet flow, sending, with the primary network element, a first update message comprising the second sequence number to a backup network element of the high-availability cluster;
  receiving a modified window size value for the packet flow;
  calculating a second update window size value according to the modified window size value and the window scale factor;

receiving a third packet of the packet flow, the third packet having a third sequence number;

calculating a second difference value comprising a difference between the third sequence number and the second sequence number; and after determining that the second difference value exceeds the second update window size value, sending a second update message comprising the third sequence number to the backup network element.

2. The method of claim 1, further comprising calculating the update window size value associated with the packet flow.

3. The method of claim 2, wherein calculating the update window size value comprises multiplying the window size value by two raised to a power equal to the window scale factor.

4. The method of claim 2, wherein calculating the update window size value comprises left-shifting the window size value by the window scale factor.

5. The method of claim 1, further comprising switching over from the primary network element to the backup network element.

6. A method comprising:

receiving, with a primary network element of a high-availability cluster, a first packet of a packet flow, the first packet having a first sequence number;

receiving, with the primary network element, a second packet of the packet flow, the second packet having a second sequence number;

receiving a synchronization (SYN) packet of the packet flow, a synchronization-acknowledgement (SYN-ACK) packet associated with the packet flow, and an ACK packet of the packet flow;

retrieving a window size value and a window scale factor from at least one of the SYN packet, the SYN-ACK packet, and the ACK packet;

calculating a difference value comprising a difference between the second sequence number and the first sequence number;

after determining that the difference value exceeds an update window size value associated with the packet flow, wherein the update window size value is based on the window size value associated with the packet flow and the window scale factor associated with the packet flow, sending, with the primary network element, an update message comprising the second sequence number to a backup network element of the high-availability cluster; and sending the window size value and the window scale factor value to the backup network element.

7. The method of claim 6, further comprising:

retrieving a maximum segment size value from at least one of the SYN packet, the SYN-ACK packet, and the ACK packet; and sending the maximum segment size value to the backup network element.

8. A method comprising:

receiving, with a primary network element of a high-availability cluster, a first packet of a packet flow, the first packet having a first sequence number;

receiving, with the primary network element, a second packet of the packet flow, the second packet having a second sequence number;

calculating a first difference value comprising a difference between the second sequence number and the first sequence number;

after determining that the first difference value exceeds an update window size value associated with the packet flow, wherein the update window size value is based on a window size value associated with the packet flow and a window scale factor associated with the packet flow, sending, with the primary network element, a first update message comprising the second sequence number to a backup network element of the high-availability cluster;

receiving a third packet of the packet flow, the third packet having a third sequence number;

calculating a second difference value comprising a difference between the third sequence number and the second sequence number; and after determining that the second difference value exceeds the update window size value, sending a second update message comprising the third sequence number to the backup network element.

9. A method comprising:

receiving, with a primary network element of a high-availability cluster, a first packet of a first packet flow, the first packet having a first sequence number;

receiving, with the primary network element, a second packet of the first packet flow, the second packet having a second sequence number;

calculating a first difference value comprising a difference between the second sequence number and the first sequence number;

after determining that the first difference value exceeds a first update window size value associated with the packet flow, wherein the first update window size value is based on a first window size value associated with the first packet flow and a first window scale factor associated with the first packet flow, sending, with the primary network element, a first update message comprising the second sequence number to a backup network element of the high-availability cluster;

receiving a third packet of a second packet flow, the third packet having a third sequence number;

receiving a fourth packet of the second packet flow, the fourth packet having a fourth sequence number;

calculating a second difference value comprising a difference between the fourth sequence number and the third sequence number; and after determining that the second difference value exceeds a second update window size value associated with the second packet flow, wherein the second update window size value is based on a second window size value associated with the second packet flow and a second window scale factor associated with the second packet flow, sending a second update message comprising the fourth sequence number to the backup network element, wherein the second update message is associated with the second packet flow.

10. A primary network element of a high-availability cluster configured to operate in a cluster mode, the network element comprising:

a network interface configured to receive a first packet of a packet flow, the first packet having a first sequence number, to receive a second packet of the packet flow, the second packet having a second sequence number, to receive a modified window size value for the packet flow, and to receive a third packet of the packet flow, the third packet having a third sequence number;

a control unit configured to calculate a first difference value comprising a difference between the second sequence number and the first sequence number, to determine whether the first difference value exceeds a first update window size value associated with the packet flow, wherein the first update window size value is based on a window size value associated with the packet flow and a window scale factor associated with the packet flow, to calculate a second update window size value according to the modified window size value and the window scale factor, to calculate a second difference value comprising a difference between the third sequence number and the second sequence number, and to determine whether the second difference value exceeds the second update window size value; and a backup network interface configured to send a first update message comprising the second sequence number to a backup network element of the high-availability cluster when the first difference value exceeds the first update window size and to send a second update message comprising the third sequence number to the backup network element when the second difference value exceeds the second update window size.

11. The primary network element of claim 10, wherein the control unit is configured to calculate the update window size value.

12. The primary network element of claim 10, wherein the primary network element comprises a primary stateful firewall, and wherein the backup network element comprises a backup stateful firewall.

13. The primary network element of claim 12, wherein the control unit is configured to perform stateful inspection of packets of the packet flow to detect network attacks in the packets and to block the packets in which the network attacks are detected.

14. The primary network element of claim 10, wherein the primary network element comprises a primary network device.

15. The primary network element of claim 10, wherein the primary network element comprises a primary control unit of a network device.

16. The primary network element of claim 10, wherein the primary network element maintains a plurality of different update window size values for a plurality of different packet flows, and wherein the primary network element computes the update window size value for each of the packet flows as a function of a window size value associated with the respective packet flow and a window scale factor defined by the primary network element for the respective packet flow.

17. A primary network element of a high-availability cluster configured to operate in a cluster mode, the network element comprising:
a computer-readable medium comprising a flow table;
a network interface configured to receive a first packet of a packet flow, the first packet having a first sequence number, to receive a second packet of the packet flow, the second packet having a second sequence number, and to receive a synchronization (SYN) packet of the packet flow, a synchronization-acknowledgement (SYN-ACK) packet associated with the packet flow, and an ACK packet of the packet flow;
a control unit configured to retrieve a window size value and a window scale factor from at least one of the SYN packet, the SYN-ACK packet, and the ACK packet and store the window size value and the window scale factor in an entry of the flow table, wherein the entry is associated with the packet flow, to calculate a difference value comprising a difference between the second sequence number and the first sequence number, and to determine whether the difference value exceeds an update window size value associated with the packet flow, wherein the update window size value is based on a window size value associated with the packet flow and a window scale factor associated with the packet flow; and a backup network element interface configured to send the window size value and the window scale factor value to the backup network element, and to send an update message comprising the second sequence number to a backup network element of the high-availability cluster.

18. A non-transitory computer-readable storage medium encoded with instructions for causing a programmable processor of a primary network element of a high-availability cluster to:
calculate a first update window size value associated with a packet flow based on a first window size value associated with the packet flow and a window scale factor associated with the packet flow;
receive a first packet of the packet flow, the first packet having a first sequence number;
receive a second packet of the packet flow, the second packet having a second sequence number;
calculate a first difference value comprising a difference between the second sequence number and the first sequence number;
determine whether the first difference value exceeds the first update window size value;
send a first update message comprising the second sequence number to a backup network element of the high-availability cluster when the difference value is determined to exceed the update window;
receive a modified window size value for the packet flow;
calculate a second update window size value according to the modified window size value and the window scale factor;
receive a third packet of the packet flow, the third packet having a third sequence number;
calculate a second difference value comprising a difference between the third sequence number and the second sequence number; and
after determining that the second difference value exceeds the second update window size value, send a second update message comprising the third sequence number to the backup network element.

19. A method comprising:
receiving, with a backup network element of a high-availability cluster, a first update message from a primary network element of the high-availability cluster, wherein the first update message comprises a first sequence number of a packet of a packet flow, wherein a difference between the first sequence number and a previously received sequence number corresponds to a first update window size;
receiving, with the backup network element, a second update message from the primary network element, wherein the second update message comprises a second sequence number, wherein a difference between the second sequence number and the first sequence number corresponds to a second update window size;
receiving, with the backup network element, a message indicating that the backup network element is to become active and act as a primary network element;
after becoming active, sending, with the backup network element, probe packets to a client device of the packet flow and a server device of the packet flow, wherein the probe packets each comprise a probe sequence number equal to the second sequence number;
receiving, with the backup network element, at least one of a retransmission comprising a current sequence number from the client device or an acknowledgement message comprising the current sequence number from the server device; and associating the current sequence number received from the retransmission or the acknowledgement message with the packet flow.

20. The method of claim 19, wherein the probe packets comprise a first set of probe packets, and wherein the probe sequence number comprises a first probe sequence number, the method further comprising:

receiving a maximum segment size value associated with the packet flow from the primary network element; and sending a second set of probe packets to the client device and the server device, wherein the second set of probe packets each comprise a second probe sequence number corresponding to the sequence number of the update message incremented by a multiple of the maximum segment size value.

21. The method of claim 20, wherein receiving the retransmission or the acknowledgement message comprises receiving the retransmission or the acknowledgement message in response to the second set of probe packets.

22. The method of claim 20, further comprising:

starting a timer after sending the first set of probe packets; and wherein sending the second set of probe packets comprises sending the second set of probe packets when the timer expires.

23. A backup network element of a high-availability cluster configured to operate in a cluster mode, the backup network element comprising:

a primary network element interface configured to receive a first update message from a primary network element of the high-availability cluster, wherein the first update message comprises a first sequence number of a packet of a packet flow, wherein a difference between the first sequence number and a previously received sequence number corresponds to a first update window size, to receive a second update message from the primary network element, wherein the second update message comprises a second sequence number, wherein a difference between the second sequence number and the first sequence number corresponds to a second update window size, and to receive an activate message indicating that the backup network element is to become active and act as a primary network element;

one or more network interfaces configured to send probe packets to a client device of the packet flow and a server device of the packet flow, wherein the probe packets each comprise a probe sequence number equal to the second sequence number, and to receive at least one of a retransmission comprising a current sequence number from the client device or an acknowledgement message comprising the current sequence number from the server device; and a control unit configured to cause the backup network element to become active in response to the activate message and to associate the current sequence number received from the retransmission or the acknowledgement message with the packet flow.

24. The backup network element of claim 23, wherein the probe packets comprise a first set of probe packets, wherein the probe sequence number comprises a first probe sequence number, wherein the primary network element interface is further configured to receive a maximum segment size value associated with the packet flow from the primary network element, and wherein the one or more network interfaces are configured to send a second set of probe packets to the client device and the server device, wherein the second set of probe packets each comprise a second probe sequence number corresponding to the sequence number of the update message incremented by a multiple of the maximum segment size value.

25. The backup network element of claim 24, wherein the control unit is configured to start a timer after the first set of probe packets are sent, and wherein the one or more network interfaces are configured to send the second set of probe packets after the timer expires.

26. A non-transitory computer-readable storage medium encoded with instructions for causing a programmable processor of a backup network element of a high-availability cluster to:

receive a first update message from a primary network element of the high-availability cluster, wherein the first update message comprises a sequence number of a packet of a packet flow, wherein a difference between the first sequence number and a previously received sequence number corresponds to a first update window size;

receive a second update message from the primary network element, wherein the second update message comprises a second sequence number, wherein a difference between the second sequence number and the first sequence number corresponds to a second update window size receive a message indicating that the backup network element is to become active and act as a primary network element;

after becoming active, send probe packets to a client device of the packet flow and a server device of the packet flow, wherein the probe packets each comprise a probe sequence number equal to the second sequence number;

receive at least one of a retransmission comprising a current sequence number from the client device or an acknowledgement message comprising the current sequence number from the server device; and associate the current sequence number received from the retransmission or the acknowledgement message with the packet flow.

27. The non-transitory computer-readable storage medium of claim 26, wherein the probe packets comprise a first set of probe packets, and wherein the probe sequence number comprises a first probe sequence number, further comprising instructions to:

receive a maximum segment size value associated with the packet flow from the primary network element; and send a second set of probe packets to the client device and the server device, wherein the second set of probe packets each comprise a second probe sequence number corresponding to the sequence number of the update message incremented by a multiple of the maximum segment size value.

28. The non-transitory computer-readable storage medium of claim 27, wherein the instructions to receive the retransmission or the acknowledgement message comprise instructions to receive the retransmission or the acknowledgement message in response to the second set of probe packets.

29. The non-transitory computer-readable storage medium of claim 27, further comprising instructions to:

start a timer after sending the first set of probe packets; and
wherein the instructions to send the second set of probe packets comprise instructions to send the second set of probe packets when the timer expires.

30. A system forming a high-availability cluster of network devices, the system comprising:
a primary network element comprising:
a network interface configured to receive a first packet of a packet flow, the first packet having a first sequence number, to receive a second packet of the packet flow, the second packet having a second sequence number, to receive a modified window size value for the packet flow, and to receive a third packet of the packet flow, the third packet having a third sequence number;
a first control unit configured to calculate a first difference value comprising a difference between the second sequence number and the first sequence number, to determine whether the first difference value exceeds a first update window size value associated with the packet flow, wherein the first update window size value is based on a window size value associated with the packet flow and a window scale factor associated with the packet flow, to calculate a second update window size value according to the modified window size value and the window scale factor, to calculate a second difference value comprising a difference between the third sequence number and the second sequence number, and to determine whether the second difference value exceeds the second update window size value; and
a backup network interface; and
a backup network element comprising:
a primary network element interface configured to receive a first update message from the primary network element, wherein the update message comprises the second sequence number, to receive a second update message comprising the third sequence number from the primary network element, and to receive an activate message indicating that the backup network element is to become active and act as a primary network element;
one or more network interfaces configured to send probe packets to a client device of the packet flow and a server device of the packet flow, wherein the probe packets each comprise a probe sequence number equal to the second sequence number, to receive at least one of a retransmission comprising a current sequence number from the client device or an acknowledgement message comprising the current sequence number from the server device, and
a second control unit configured to cause the backup network element to become active in response to the activate message and to associate the current sequence number received from the retransmission or the acknowledgement message with the packet flow,
wherein the backup network interface of the primary network element is configured to send the first update message comprising the second sequence number to the backup network element when the first difference value exceeds the first update window size and to send the second update message comprising the third sequence number to the backup network element when the second difference value exceeds the second update window size.

* * * * *